(12) United States Patent
Budagavi et al.

(10) Patent No.: US 11,412,257 B2
(45) Date of Patent: *Aug. 9, 2022

(54) LOW COMPLEXITY LARGE TRANSFORM

(71) Applicant: Texas Instruments Incorporated, Dallas, TX (US)

(72) Inventors: Madhukar Budagavi, Plano, TX (US); Ajit Gupte, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/630,100

(22) Filed: Feb. 24, 2015

(65) Prior Publication Data

US 2015/0172718 A1 Jun. 18, 2015

Related U.S. Application Data

(63) Continuation of application No. 13/250,667, filed on Sep. 30, 2011, now Pat. No. 8,995,532.

(Continued)

(51) Int. Cl.
*H04N 19/60* (2014.01)
*H04N 19/122* (2014.01)
(Continued)

(52) U.S. Cl.
CPC .......... *H04N 19/60* (2014.11); *H04N 19/122* (2014.11); *H04N 19/176* (2014.11); *H04N 19/61* (2014.11)

(58) Field of Classification Search
CPC .... H04N 19/60; H04N 19/122; H04N 19/176; H04N 19/61
(Continued)

(56) References Cited

U.S. PATENT DOCUMENTS 5,541,914 A 7/1996 Krishnamoorthy et al.
6,587,590 B1 * 7/2003 Pan ....................... G06F 17/147
382/250

(Continued)

OTHER PUBLICATIONS

Thomas Wiegand et al, "WD1: Working Draft 1 of High-Efficiency Video Coding", JCTVC-C403, Oct. 7-15, 2010, Joint Collaborative Team on Video Coding (JCT-VC) of ITU-T SG16 WP3 and ISO/IEC JTC1/SC29/WG11, Guangzhou, China, pp. 1-137.

(Continued)

*Primary Examiner* — Joseph W Becker
(74) *Attorney, Agent, or Firm* — Charles F. Koch; Charles A. Brill; Frank D. Cimino (57) ABSTRACT

Methods of encoding a video stream in a video encoder and decoding an encoded video stream in a video decoder using a low complexity large transform are provided. An encoding method includes receiving an n×n residual block in a transform component of the video encoder, and transforming the n×n residual block using an n×n transform to generate an n×n transform coefficient block, wherein the n×n transform is based on (n/m*n/m) m×m Hadamard transforms and (m*m) (n/m)×(n/m) discrete cosign transforms, wherein m<n. A decoding method includes receiving an n×n transform coefficient block in an inverse transform component of the video decoder, and applying an n×n inverse transform to the n×n transform coefficient block to reconstruct an n×n residual block, wherein the n×n inverse transform is based on (n/m*n/m) m×m Hadamard transforms and (m*m) (n/m)×(n/m) inverse discrete cosign transforms, wherein m<n.

8 Claims, 5 Drawing Sheets

Related U.S. Application Data (60) Provisional application No. 61/388,497, filed on Sep. 30, 2010.

(51) Int. Cl.
*H04N 19/61* (2014.01)
*H04N 19/176* (2014.01)

(58) Field of Classification Search
USPC ........................................ 375/240.2
See application file for complete search history.

(56) References Cited

U.S. PATENT DOCUMENTS

| | | | | |
|---|---|---|---|---|
| 7,848,580 B2* | 12/2010 | Horie | ............ | H04N 19/136 382/232 |
| 8,000,546 B2 | 8/2011 | Yang et al. | | |
| 8,126,951 B2* | 2/2012 | Huang | ............ | H04N 19/63 708/402 |
| 8,190,668 B2* | 5/2012 | Li | ............ | H04N 19/44 708/400 |
| 9,110,849 B2* | 8/2015 | Reznik | ............ | G06F 17/147 |
| 2003/0120691 A1 | 6/2003 | Nakayama | | |
| 2006/0133683 A1* | 6/2006 | Srinivasan | ........... | H04N 19/635 382/250 |
| 2009/0254736 A1 | 10/2009 | Symes et al. | | |
| 2010/0172409 A1 | 7/2010 | Reznik et al. | | |
| 2011/0110600 A1* | 5/2011 | Niemi | ............ | H04N 19/176 382/248 |

OTHER PUBLICATIONS

Madhukar Budagavi and Ajit Gupte, "DCT+Hadamard Low Complexity Large Transform for Inter Coding", JCTVC-C255, Oct. 7-15, 2010, Joint Collaborative Team on Video Coding (JCT-VC) of ITU-T SG16 WP3 and ISO/IEC JTC1/SC29/WG11, Guangzhou, China, pp. 1-2.

Madhukar Budagavi and Ajit Gupte, "DCT+Hadamard Large Transform", JCTVC-D037, Jan. 20-28, 2011, Joint Collaborative Team on Video Coding (JCT-VC) of ITU-T SG16 WP3 and ISO/IEC JTC1/SC29/WG11, Daegu, South Korea, pp. 1-4.

C. Loeffler et al, "Practical Fast 1D DCT Algorithms with 11 Multiplications", Proc. Int'l. Conf. on Acoustics, Speechm and Signal Processing 1989 (ICASSP '89), pp. 988-991.

\* cited by examiner

LOW COMPLEXITY LARGE TRANSFORM

CROSS-REFERENCE TO RELATED APPLICATIONS

This application is a Continuation of and claims priority to U.S. patent application Ser. No. 13/250,667, filed Sep. 30, 2011, which claims benefit of U.S. Provisional Patent Application Ser. No. 61/388,497, filed Sep. 30, 2010, both of which are incorporated herein by reference in their entirety.

BACKGROUND OF THE INVENTION

1. Field of the Invention

Embodiments of the present invention generally relate to a low complexity large transform for video coding.

2. Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

In the emerging next generation video coding standard currently under development by a Joint Collaborative Team on Video Coding (JCT-VC) established by the ISO/IEC Moving Picture Experts Group (MPEG) and ITU-T Video Coding Experts Group (VCEG) that is commonly referred to High Efficiency Video Coding (HEVC), discrete cosine transforms (DCT) are proposed with the following blocks sizes: 4×4, 8×8, 16×16, 32×32 and 64×64. While large block size transforms such as 16×16, 32×32 and 64×64 DCTs improve coding efficiency, using such transforms increases implementation complexity significantly.

In general, the complexity of transforms typically increases with $O(N \log(N))$ for fast algorithms and $O(N^3)$ for implementation with direct matrix multiplication. For example, in the HEVC test model under consideration, version 0.7.3 (TMuC-0.7.3), the implemented 16×16 transform requires 1408 multiplications and the implemented 32×32 transform requires 7424 multiplications, an almost 5× increase in complexity. A direct matrix multiplication implementation of a 16×16 transform requires $16^3$ multiplications and a direct matrix multiplication implementation of a 32×32 transform requires $32^3$ multiplications, an 8× increase in complexity. Accordingly, improvements in implementation complexity of large block transforms are needed to ensure the feasibility of HEVC implementations.

SUMMARY

Embodiments of the present invention relate to methods of encoding a video stream in a video encoder and decoding an encoded video stream in a video decoder using a low complexity large transform. In one aspect, a method of encoding a video stream in a video encoder includes receiving an n×n residual block in a transform component of the video encoder, and transforming the n×n residual block using an n×n transform to generate an n×n transform coefficient block, wherein the n×n transform is based on (n/m*n/m) m×m Hadamard transforms and (m*m) (n/m)×(n/m) discrete cosign transforms (DCT), wherein m<n. In one aspect, a method of decoding an encoded video stream in a video decoder includes receiving an n×n transform coefficient block in an inverse transform component of the video decoder, and applying an n×n inverse transform to the n×n transform coefficient block to reconstruct an n×n residual block, wherein the n×n inverse transform is based on (n/m*n/m) m×m Hadamard transforms and (m*m) (n/m)×(n/m) inverse discrete cosign transforms (IDCT), wherein m<n.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

For convenience of explanation, embodiments of the invention are described herein in reference to the October 2010 draft specification for HEVC entitled "WD1: Working Draft 1 of High-Efficiency Video Coding." One of ordinary skill in the art will understand that embodiments of the invention are not limited to this draft specification or to HEVC.

Some aspects of this disclosure have been presented to the JCT-VC in the following documents: JCTVC-C255, entitled "DCT+Hadamard Low Complexity Large Transform for Inter Coding", Oct. 7-15, 2010, and JCTVC-D037, entitled "DCT+Hadamard Large Transform", Jan. 20-28, 2011. Both documents are incorporated by reference herein in their entirety.

As used herein, the term "picture" refers to a frame or a field of a frame. A frame is a complete image captured during a known time interval. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, 128×128, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, 32×32 and 64×64. The sizes of the transforms units and prediction units for a CU are determined by the video encoder during prediction based on minimization of rate/distortion costs.

As is well known in the art, a discrete cosine transform (DCT) matrix may be a pure DCT matrix or a matrix derived from the pure DCT matrix by changing of one or more values while maintaining the symmetry property of the DCT. That is, a DCT may be approximated by starting with a matrix of fixed point values corresponding to the general DCT equations, i.e., the pure DCT matrix, and then altering one or more values in the matrix based on empirical evaluations. The term DCT matrix encompasses both types of matrices. The changing of some values in a pure DCT matrix is a common practice in video coding standards for some DCT transforms. An inverse DCT (IDCT) matrix is the transpose of the DCT matrix.

Embodiments of the invention provide a low complexity large transform that combines a Hadamard transform with a DCT. This transform is referred to as a DCTH transform herein and the inverse of the transform is referred to as an IDCTH transform herein. In general, the effect of a DCTH transform is that DCT is used for a smaller block size than the input block size and a Hadamard transform is applied in addition to build the bigger transform. The complexity of a DCTH transform is lower than a pure DCT of the same size because the complexity of a Hadamard transform, in which the values of matrix elements are limited to +1 or −1, is lower than that of a DCT.

FIGS. 1A, 1B, 2A, and 2B illustrate alternate designs for n×n 1D DCTH and IDCTH transforms. In general, each of the 1D IDCTH transforms (FIGS. 1A and 1B) uses n/m m-point Hadamard transforms, an n×n permutation matrix, and m (n/m)-point IDCTs where m<n. Similarly, each of the 1D DCTH transforms (FIGS. 1B and 2B) uses n/m m-point Hadamard transforms, an n×n permutation matrix, and m (n/m)-point DCTs where m<n. The values of m and n may vary and may be determined by a video coding standard along with the values of the IDCT and DCT matrices. In addition, the value of m may not be the same for all transform block sizes. The difference between the transform designs of FIGS. 1A, 1B and FIG. 2A, 2B is the order in which the Hadamard transforms and the DCTs or IDCTs are applied. For example, in the 1D IDCTH transform of FIG. 1A, the m-point Hadamard transforms 104 are applied to the input vector 102 first, followed by the permutation 106, and then the (n/m)-point IDCTs 108 are applied. In the 1D IDCTH transform of FIG. 2A, the (n/m)-point IDCTs 208 are applied to the input vector 202 first, followed by the permutation 206, and then the m-point Hadamard transforms 204 are applied.

Figure 1A:
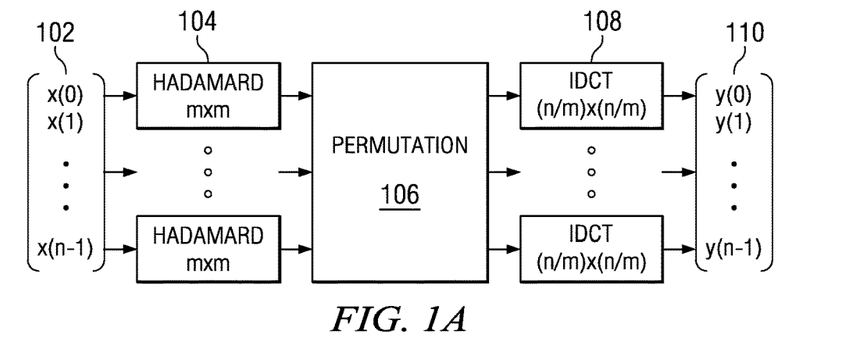
FIGS. 1A, 1B, 2A, and 2B show block diagrams of transform designs.

In the 1D IDCTH transform of FIG. 1A, the first m elements of the n-element input vector 102, $x(0), \ldots x(m-1)$, are inputs to first Hadamard(m) transform engine, the next m elements, $x(m), \ldots x(2m-1)$, are inputs to the second Hadamard(m) transform engine, and so on. The outputs of Hadamard(m) engines are concatenated to form an intermediate (n/m)-element vector z, $z(0) \ldots z(n/m-1)$. A permutation is then applied to z by the permutation engine 106. That is, the permutation engine 106 rearranges the elements in z according to a permutation matrix (explained below) to form an n-element vector w, $w(0) \ldots w(n-1)$. The first n/m elements of w, $w(0) \ldots w(n/m-1)$, are inputs to the first IDCT(n/m) engine, the second n/m elements, $w(n/m) \ldots w(2n/m-1)$, are inputs to the second IDCT(n/m) engine, and so on. The outputs of the IDCT(n/m) engines are concatenated to form the n-element output vector 110, $y(0), \ldots y(n-1)$.

Figure 2A:
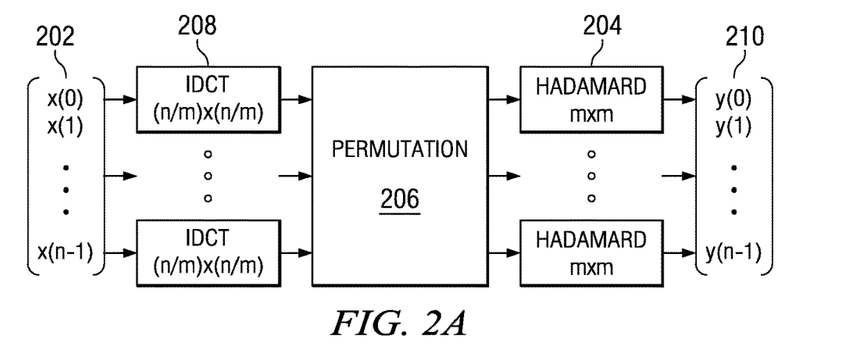

In the 1D IDCTH transform of FIG. 2A, the first n/m elements of the n-element input vector 202, $x(0) \ldots x(n/m-1)$, are inputs to the first IDCT(n/m) engine, the second n/m elements, $x(n/m) \ldots x(2n/m-1)$, are inputs to the second IDCT(n/m) engine, and so on. The outputs of IDCT (n/m) engines are concatenated to form an intermediate n-element vector z, $z(0) \ldots z(n-1)$. A permutation is then applied to z by the permutation engine 206. That is, the permutation engine 206 rearranges the elements in z according to a permutation matrix (explained below) to form an n-element vector w, $w(0) \ldots w(n)$. The first m elements of the of w, $w(0), \ldots w(m-1)$, are inputs to first Hadamard(m) transform engine, the next m elements, $w(m), \ldots w(2m-1)$, are inputs to the second Hadamard(m) transform engine, and so on. The outputs of the Hadamard(m) engines are concatenated to form the n-element output vector 210, $y(0), \ldots y(n-1)$.

Figure 1B:
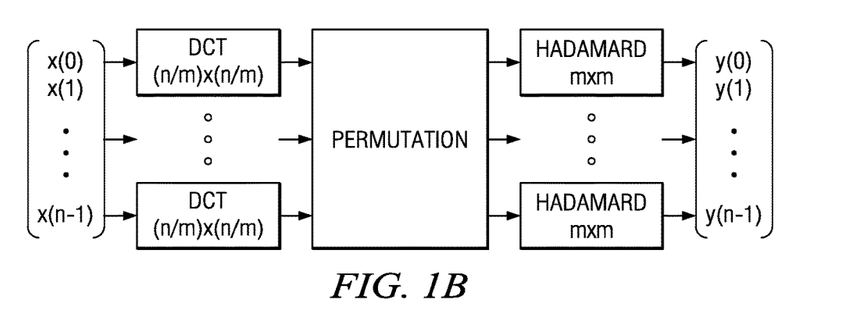
Figure 2B:
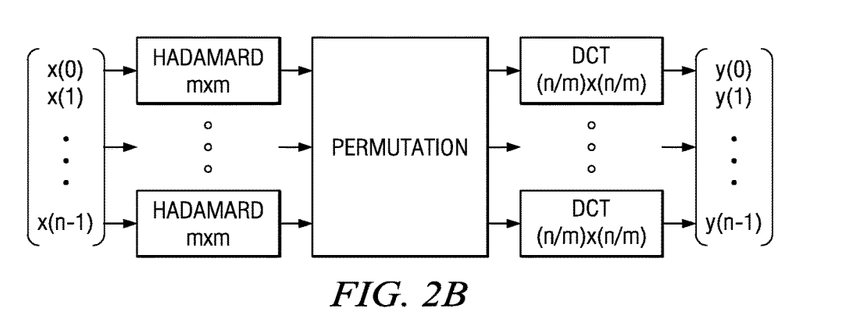

The 1D DCTH transforms of FIGS. 1B and 2B operate in a similar fashion to the IDCTH transforms except that DCT engines are used rather than IDCT engines. Note that the DOTH transform of FIG. 1B is identical to the IDCTH transform of FIG. 2A except for the substitution of DCT(n/m) engines for the IDCT (n/m) engines and the DOTH transform of FIG. 2B is similarly identical to the IDCTH transform of FIG. 1A.

To perform an IDCTH 2D transform, the 1D transform of FIG. 1A (FIG. 2A) may be applied to each of the n columns of an input 2D n×n block X, where the output vectors form the successive columns of a 2D n×n block Z. Then, the 1D transform is applied to each of the rows of Z, where the output vectors form the successive rows of the final output, a 2D n×n block Y. Alternatively, the 1D transform of FIG. 1A (FIG. 2A) may be applied to each of the n rows of an input 2D n×n block X, where the output vectors form the successive rows of a 2D n×n block Z. Then, the 1D transform is applied to each of the columns of Z, where the output vectors form the successive columns of the final output, a 2D n×n block Y. DCTH 2D transforms may be similarly performed with the 1D transforms of FIGS. 1B and 2B.

An n×n 2D IDCTH or DCTH transform may be implemented based on three n×n matrices, a matrix H that is the Kronecker product of an (n/m)×(n/m) identity matrix and the m×m Hadamard transform matrix, a permutation matrix P, and a matrix D that is the Kronecker product of an m×m identity matrix and the (n/m)×(n/m) IDCT or DCT matrix. As previously stated, an IDCT matrix is the transpose of a DCT matrix.

The permutation matrix P is an n×n matrix having exactly one entry with a value of 1 in each row and each column and 0's elsewhere and the placement of the 1 values is designed to preserve sequency. An identity matrix is a square matrix with ones on the diagonal and zeros elsewhere. The Kronecker product, denoted by ⊗, is an operation on two matrices of arbitrary size resulting in a square matrix. For example, if A is an m-by-n matrix and B is a p-by-q matrix, then the Kronecker product A⊗B is the mp-by-nq square matrix $$A \otimes B = \begin{bmatrix} a_{11}B & \cdots & a_{1n}B \\ \vdots & \ddots & \vdots \\ a_{m1}B & \cdots & a_{mn}B \end{bmatrix}.$$

The H, P, and D matrices for an 8×8 IDCTH using a Hadamard(2) transform may be defined as shown below. For this example, n=8 and m=2, so the size of the IDCTs is n/m=4.

$$H2 = \begin{bmatrix} 1 & 1 \\ 1 & -1 \end{bmatrix}$$

$$H = \begin{bmatrix} H2 & 0 & 0 & 0 \\ 0 & H2 & 0 & 0 \\ 0 & 0 & H2 & 0 \\ 0 & 0 & 0 & H2 \end{bmatrix}$$

$$P = \begin{bmatrix} 1 & 0 & 0 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 0 & 0 & 1 \end{bmatrix}$$

$$D4 = IDCT4 \times 4\text{matrix}$$

$$D = \begin{bmatrix} D4 & 0 \\ 0 & D4 \end{bmatrix}$$

The H, P, and D matrices for other sizes of IDCTH transforms, e.g., n=16, 32, 64, and/or other sizes of Hadamard transforms, e.g., 4, 8, 16, may be similarly derived. As is explained in more detail below, the same H, P, and D matrices may be used for both the IDCTH and DCTH transforms. Note that as the size of the Hadamard transform increases, the complexity of the IDCTH (DCTH) transform decreases but the compression performance also decreases. If defined in a video coding standard, the H, P, and D matrices may be specified for each specified transform block size for which a DCTH/IDCTH transform is allowed.

The individual matrices H, P, and D may be used to implement the 2D IDCTH transform and the 2D DCTH transform. For example, for the 2D IDCTH transform, direct matrix multiplication may be used to compute $HPDXD^TP^TH^T$ or $DPHXH^TP^TD^T$ (depending on the order of application of the Hadamard transforms and IDCTs) where X is the n×n input block. Alternatively, a predetermined matrix T=HPD or T=DPH (depending on the order of application of the Hadamard transforms and IDCTs) may be used perform the 2D IDCTH transform. That is, direct matrix multiplication may be used to compute $TXT^T$.

The corresponding 2D DCTH transform may similarly implemented in the inverse. That is, if the IDCTH transform is computed as $HPDXD^TP^TH^T$, the corresponding DCTH transform is computed as $D^TP^TH^TXHPD$. Note that these matrix computations are the 2D versions of FIGS. 2A and 2B. Further, if the IDCTH transform is computed as $DPHXH^TP^TD^T$, the corresponding DCTH transform is computed as $H^TP^TD^TXDPH$. The inverse of $TXT^T$ is $T^TXT$. Note that these matrix computations are the 2D versions of FIGS. 1A and 1B.

The 2D IDCTH transform may also be implemented by first computing $P^TH^TXHP$ and then applying the m*m (n/m)×(n/m) IDCTs to the result. For application of the IDCTs, each row or column vector of the result can be split into subvectors of n/m elements and the (n/m)-point IDCT can be performed on each subvector. Any suitable IDCT algorithm may be used to perform the IDCTs on the subvectors. For example, the techniques described in co-pending U.S. patent application Ser. No. 13/250,822 (TI-70075), entitled "Transformation and Quantization Architecture for Video Coding and Decoding", filed on Sep. 30, 2011, may be used. Other examples of suitable techniques are described in C. Loeffler, et al., "Practical Fast 1-D DCT Algorithms with 11 Multiplications", Proc. Inn Conf. on Acoustics, Speech, and Signal Processing 1989 (ICASSP '89), pp. 988-991. The corresponding 2D DCTH transform may be similarly computed by first computing $P^TH^TXHP$ and then applying the m*m (n/m)×(n/m) DCTs to the result. In general, the DCT and the Hadamard transforms can be applied in separate steps or can be combined together and applied.

The above description assumes the D matrix is derived from an IDCT matrix, which is the inverse of a DCT matrix. D may also be derived from a DCT matrix in a similar fashion as the derivation from an IDCT matrix. If D is derived from a DCT matrix, for the 2D IDCTH transform, direct matrix multiplication may be used to compute $HPD^TXDP^TH^T$ or $D^TPHXH^TP^TD$ (depending on the order of application of the Hadamard transforms and IDCTs). The corresponding DCTH transform computations would be $DP^TH^TXHPD^T$ and $H^TP^TDXD^TPH$. The predetermined matrix T would be computed as $T=HPD^T$ or $T=D^TPH$.

Figure 3:
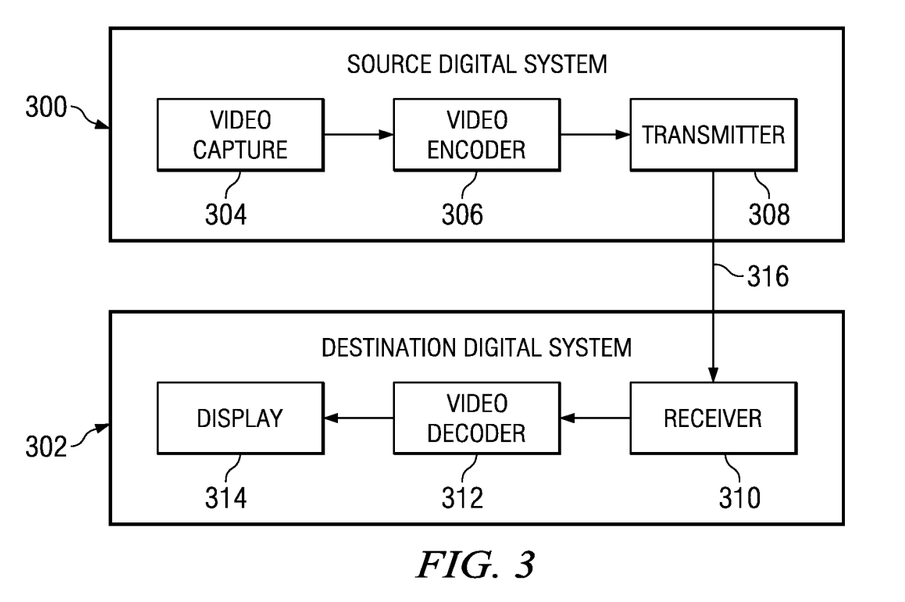
FIG. 3 shows a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of frames, divides the frames into largest coding units (LCUs), and encodes the video data in the LCUs. The video encoder component 306 may be configured to apply transformation and inverse transformation techniques during the encoding process as described herein. Embodiments of the video encoder component 306 are described in more detail herein in reference to FIGS. 4A and 4B.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to apply inverse transformation techniques during the decoding process as described herein. Embodiments of the video decoder component 312 are described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4A:
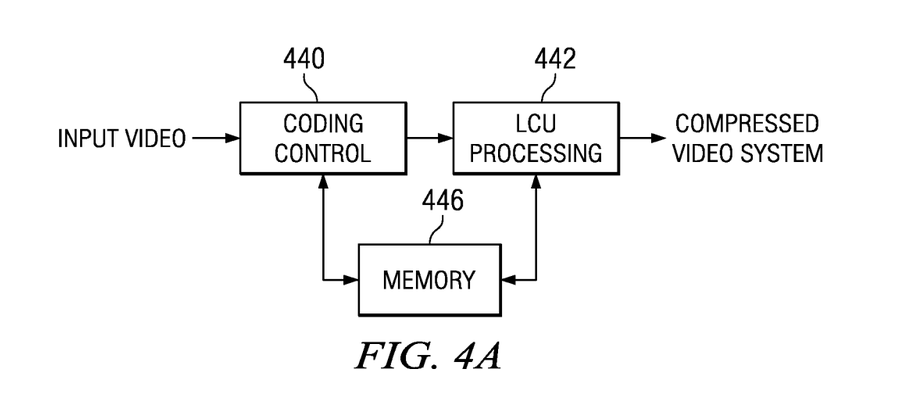
FIGS. 4A and 4B show block diagrams of a video encoder.
Figure 4B:
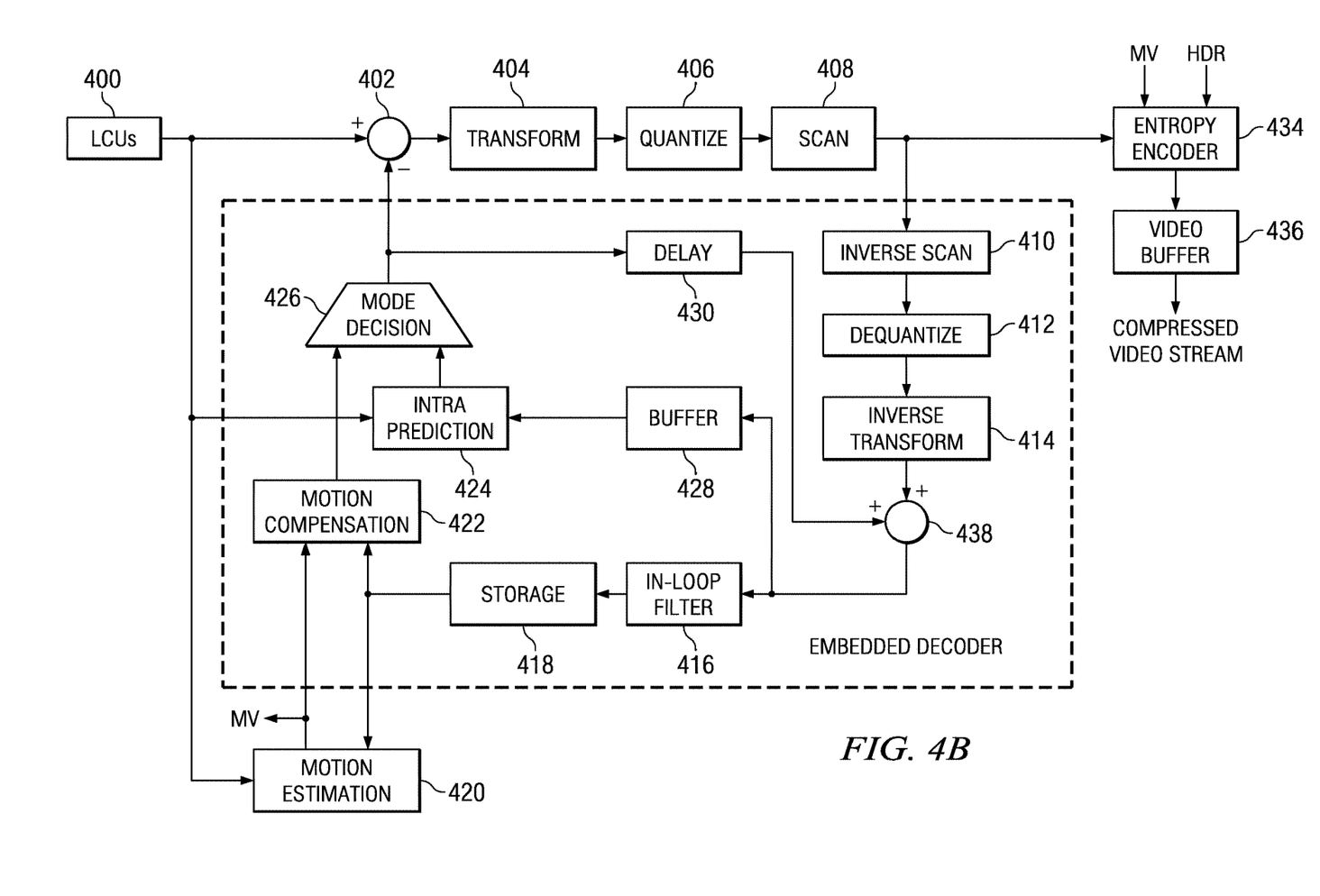

FIGS. 4A and 4B show block diagrams of a video encoder. FIG. 4A shows a high level block diagram of the video encoder and FIG. 4B shows a block diagram of the LCU processing component 442 of the video encoder. As shown in FIG. 4A, a video encoder includes a coding control component 440, an LCU processing component 442, and a memory 446. The memory 446 may be internal memory, external memory, or a combination thereof. An input digital video sequence is provided to the coding control component 440. The coding control component 440 sequences the various operations of the video encoder. For example, the coding control component 440 performs any processing on the input video sequence that is to be done at the frame level, such as determining the coding type (I, P, or B) of a picture based on the high level coding structure, e.g., IPPP, IBBP, hierarchical-B, and dividing a frame into LCUs for further processing.

The coding control component 440 may also determine the initial LCU CU structure for each CU and provide information regarding this initial LCU CU structure to the various components of the LCU processing component 442 as needed. The coding control component 440 may also determine the initial PU and TU structures for the CUs. The coding control component 440 also includes rate control functionality that determines the quantization parameter(s) for the CUs.

The LCU processing component 442 receives LCUs of the input video sequence from the coding control component 440 and encodes the LCUs to generate the compressed video stream. The CUs in the CU structure of an LCU may be processed by the LCU processing component 442 in a depth-first Z-scan order.

FIG. 4B shows the basic coding architecture of the LCU processing component 442. The LCUs 400 from the coding control unit 440 are provided as one input of a motion estimation component 420, as one input of an intra prediction component 424, and to a positive input of a combiner 402 (e.g., adder or subtractor or the like). Further, although not specifically shown, the prediction mode of each picture as selected by the coding control component 440 is provided to a mode selector component, and the entropy encoder 434.

The storage component 418 provides reference data to the motion estimation component 420 and to the motion compensation component 422. The reference data may include one or more previously encoded and decoded CUs, i.e., reconstructed CUs.

The motion estimation component 420 provides motion estimation information to the motion compensation component 422 and the entropy encoder 434. More specifically, the motion estimation component 420 performs tests on CUs in an LCU based on multiple temporal prediction modes and transform block sizes using reference data from storage 418 to choose the best motion vector(s)/prediction mode based on a coding cost. To perform the tests, the motion estimation component 420 may begin with a CU structure provided by the coding control component 440. The motion estimation component 420 may divide each CU indicated in the CU structure into prediction units according to the unit sizes of prediction modes and into transform units according to the transform block sizes and calculate the coding costs for each prediction mode and transform block size for each CU.

For coding efficiency, the motion estimation component 420 may also decide to alter the CU structure by further partitioning one or more of the CUs in the CU structure. That is, when choosing the best motion vectors/prediction modes, in addition to testing with the initial CU structure, the motion estimation component 420 may also choose to divide the larger CUs in the initial CU structure into smaller CUs (within the limits of the recursive quadtree structure), and calculate coding costs at lower levels in the coding hierarchy. If the motion estimation component 420 changes the initial CU structure, the modified CU structure is communicated to other components in the LCU processing component 442 that need the information.

The motion estimation component 420 provides the selected motion vector (MV) or vectors and the selected prediction mode for each inter predicted CU to the motion compensation component 423 and the selected motion vector (MV) to the entropy encoder 434. The motion compensation component 422 provides motion compensated inter prediction information to the mode decision component 426 that includes motion compensated inter predicted CUs, the selected temporal prediction modes for the inter predicted CUs, and corresponding transform block sizes. The coding costs of the inter predicted CUs are also provided to the mode decision component 426.

The intra prediction component 424 provides intra prediction information to the mode decision component 426 that includes intra predicted CUs and the corresponding spatial prediction modes. That is, the intra prediction component 424 performs spatial prediction in which tests based on multiple spatial prediction modes and transform unit sizes are performed on CUs in an LCU using previously encoded neighboring CUs of the picture from the buffer 428 to choose the best spatial prediction mode for generating an intra predicted CU based on a coding cost. To perform the tests, the intra prediction component 424 may begin with a CU structure provided by the coding control component 440. The intra prediction component 424 may divide each CU indicated in the CU structure into prediction units according to the unit sizes of the spatial prediction modes and into transform units according to the transform block sizes and calculate the coding costs for each prediction mode and transform block size for each CU.

For coding efficiency, the intra prediction component 424 may also decide to alter the CU structure by further partitioning one or more of the CUs in the CU structure. That is, when choosing the best prediction modes, in addition to testing with the initial CU structure, the intra prediction component 424 may also chose to divide the larger CUs in the initial CU structure into smaller CUs (within the limits of the recursive quadtree structure), and calculate coding costs at lower levels in the coding hierarchy. If the intra prediction component 424 changes the initial CU structure, the modified CU structure is communicated to other components in the LCU processing component 442 that need the information. Further, the coding costs of the intra predicted CUs and the associated transform block sizes are also provided to the mode decision component 426.

The mode decision component 426 selects between the motion-compensated inter predicted CUs from the motion compensation component 422 and the intra predicted CUs from the intra prediction component 424 based on the coding costs of the CUs and the picture prediction mode provided by the mode selector component. The output of the mode decision component 426, i.e., the predicted CU, is provided to a negative input of the combiner 402 and to a delay component 430. The associated transform block size is also provided to the transform component 404. The output of the delay component 430 is provided to another combiner (i.e., an adder) 438. The combiner 402 subtracts the predicted CU from the current CU to provide a residual CU to the transform component 404. The resulting residual CU is a set of pixel difference values that quantify differences between pixel values of the original CU and the predicted CU.

The transform component 404 performs block transforms on the residual CUs to convert the residual pixel values to transform coefficients and provides the transform coefficients to a quantize component 406. The transform component 404 receives the transform block sizes for the residual CUs and applies transforms of the specified sizes to the CUs to generate transform coefficients. For large transform block sizes, e.g., 16×16, 32×32, 64×64, the transform component 404 performs a 2D DCTH transform of the specified block size. Various options for implementing a 2D DCTH transform are previously described herein.

The quantize component 406 quantizes the transform coefficients based on quantization parameters (QPs) provided by the coding control component 440 and the transform sizes. The quantized transform coefficients are taken out of their scan ordering by a scan component 408 and arranged by significance, such as, for example, beginning with the more significant coefficients followed by the less significant. The ordered quantized transform coefficients for a CU provided via the scan component 408 along with header information for the CU are coded by the entropy encoder 434, which provides a compressed bit stream to a video buffer 436 for transmission or storage. The header information may include an indicator of the transform block size used for the CU and the quantization parameter for the CU. The entropy encoder 434 also codes the CU structure of each LCU. The entropy coding performed by the entropy encoder 434 may be use any suitable entropy encoding technique, such as, for example, context adaptive variable length coding (CAVLC), context adaptive binary arithmetic coding (CABAC), run length coding, etc.

Inside the LCU processing component 442 is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients for a CU provided via the scan component 408 are returned to their original post-transform arrangement by an inverse scan component 410, the output of which is provided to a dequantize component 412, which outputs a reconstructed version of the transform result from the transform component 404.

The dequantized transform coefficients are provided to the inverse transform component 414, which outputs estimated residual information which represents a reconstructed version of a residual CU. The inverse transform component 414 receives the transform block size used to generate the transform coefficients and applies inverse transform(s) of the specified size to the transform coefficients to reconstruct the residual values. For large transform block sizes, e.g., 16×16, 32×32, 64×64, the inverse transform component 414 performs a 2D IDCTH transform of the specified block size, i.e., the inverse of the 2D DCTH transform applied by the transform component 404. Various options for implementing a 2D IDCTH transform are previously described herein.

The reconstructed residual CU is provided to the combiner 438. The combiner 438 adds the delayed selected CU to the reconstructed residual CU to generate an unfiltered reconstructed CU, which becomes part of reconstructed picture information. The reconstructed picture information is provided via a buffer 428 to the intra prediction component 424 and to a filter component 416. The filter component 416 is an in-loop filter which filters the reconstructed frame information and provides filtered reconstructed CUs, i.e., reference data, to the storage component 418.

Figure 5:
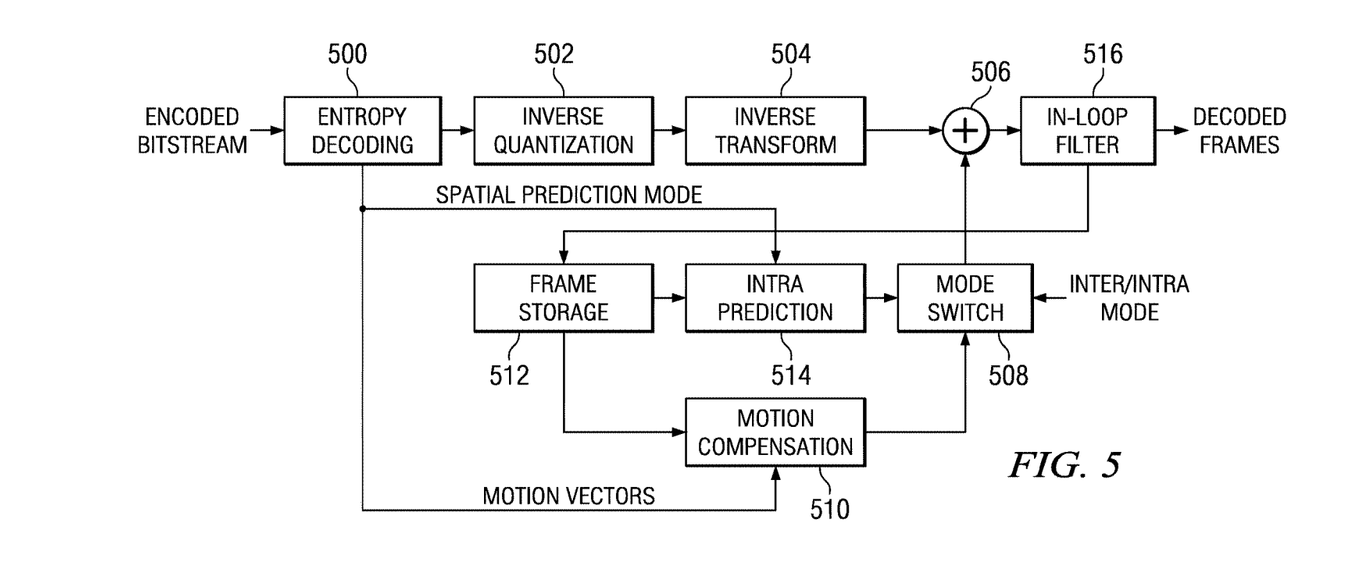
FIG. 5 shows a block diagram of a video decoder.

FIG. 5 shows a block diagram of a video decoder. The video decoder operates to reverse the encoding operations, i.e., entropy coding, quantization, transformation, and prediction, performed by the video encoder of FIGS. 4A and 4B to regenerate the frames of the original video sequence. In view of the above description of a video encoder, one of ordinary skill in the art will understand the functionality of components of the video decoder without detailed explanation.

The entropy decoding component 500 receives an entropy encoded video bit stream and reverses the entropy encoding to recover the encoded CUs and header information such as the quantization parameters, the transform block sizes, and the encoded CU structures of the LCUs. The inverse quantization component 502 de-quantizes the quantized transform coefficients of the residual CUs. The inverse transform component 504 transforms the frequency domain data from the inverse quantization component 502 back to residual CUs. That is, the inverse transform component 504 applies an inverse unit transform, i.e., the inverse of the unit transform used for encoding, to the de-quantized residual coefficients to produce the residual CUs. For large transform block sizes, e.g., 16×16, 32×32, 64×64, the inverse transform component 414 performs a 2D IDCTH transform of the appropriate block size, i.e., the inverse of the 2D DCTH transform applied by the transform component 404. Various options for implementing a 2D IDCTH transform are previously described herein.

A residual CU supplies one input of the addition component 506. The other input of the addition component 506 comes from the mode switch 508. When inter-prediction mode is signaled in the encoded video stream, the mode switch 508 selects a prediction unit from the motion compensation component 510 and when intra-prediction is signaled, the mode switch selects a prediction unit from the intra prediction component 514. The motion compensation component 510 receives reference data from storage 512 and applies the motion compensation computed by the encoder and transmitted in the encoded video bit stream to the reference data to generate a predicted CU. The intra-prediction component 514 receives previously decoded predicted CUs from the current picture and applies the intra-prediction computed by the encoder as signaled by a spatial prediction mode transmitted in the encoded video bit stream to the previously decoded predicted CUs to generate a predicted CU.

The addition component 506 generates a decoded CU, by adding the selected predicted CU and the residual CU. The output of the addition component 506 supplies the input of the in-loop filter component 516. The in-loop filter component 516 smoothes artifacts created by the block nature of the encoding process to improve the visual quality of the decoded frame. The output of the in-loop filter component 516 is the decoded frames of the video bit stream. Each decoded CU is stored in storage 512 to be used as reference data.

Figure 6:
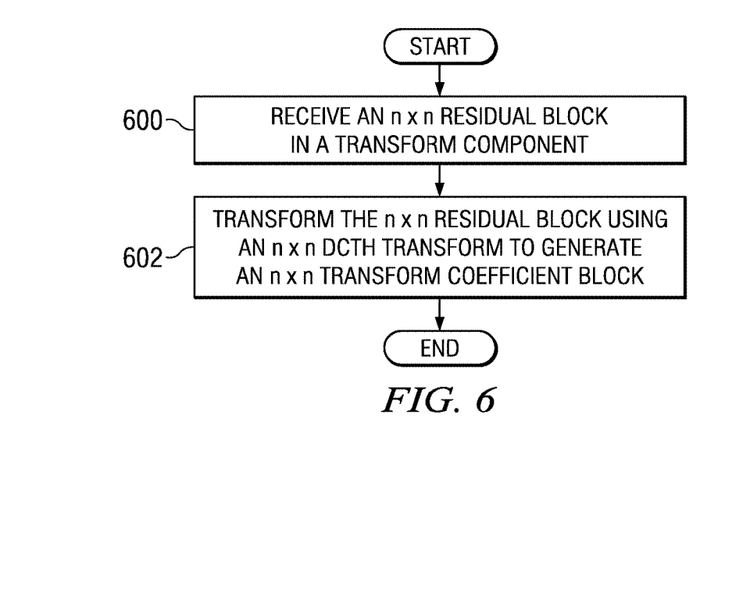
FIGS. 6 and 7 show flow diagrams of methods.

FIG. 6 is a flow diagram of a method for transforming a residual block to a transform coefficient block in a video encoder using a 2D DCTH transform. Initially, an n×n residual block is received in the transform component of the video encoder 600. The n×n residual block is then transformed using an n×n DCTH transform to generate an n×n transform coefficient block 602. The n×n DCTH transform may be performed as previously describe herein. The n×n transform coefficient block is then output by the transform component for further processing in the video encoder.

Figure 7:
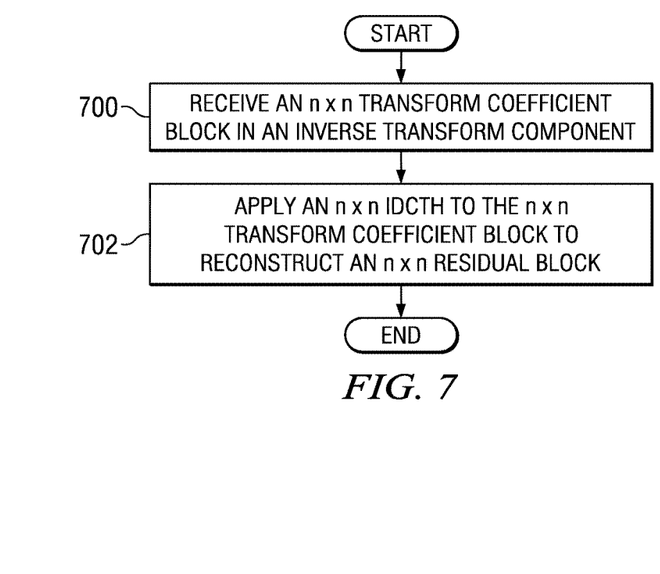

FIG. 7 is a flow diagram of a method for inverse transformation of a transform coefficient block in a video encoder or video decoder using a 2D IDCTH transform. Initially, an n×n transform coefficient block is received in the inverse transform component of the video encoder or video decoder 700. An n×n IDCTH is then applied to the n×n transform coefficient block to reconstruct an n×n residual block 702. The n×n IDCTH transform is the inverse of the n×n DCTH transform applied in a video encoder to generate the n×n transform coefficient block. The n×n IDCTH transform may be performed as previously describe herein. The n×n residual block is then output by the transform component for further processing in the video encoder or video decoder.

Figure 8:
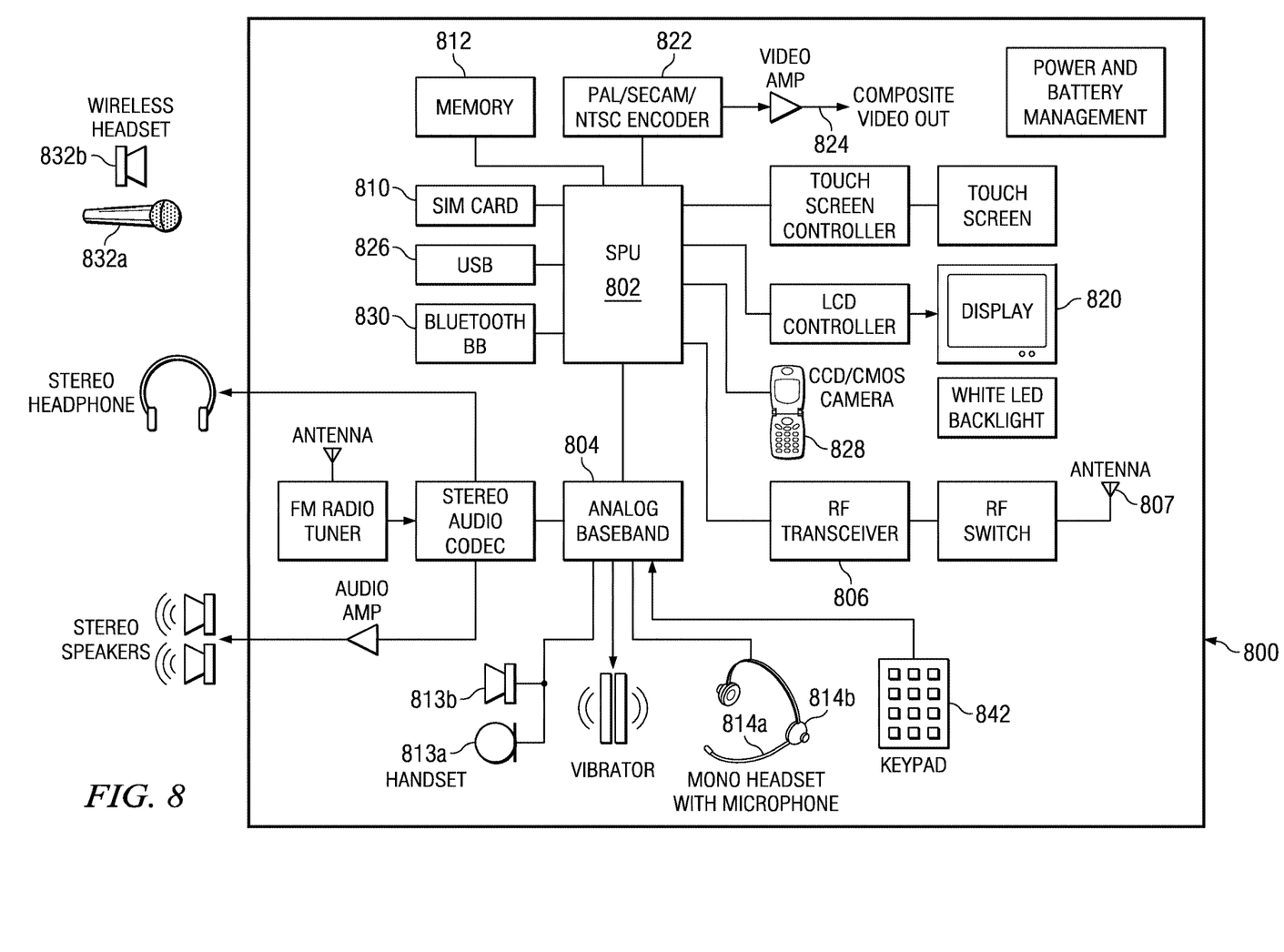
FIG. 8 shows a block diagram of an illustrative digital system.

Embodiments of the methods, encoders, and decoders described herein may be implemented for virtually any type of digital system (e.g., a desk top computer, a laptop computer, a handheld device such as a mobile (i.e., cellular) phone, a personal digital assistant, a digital camera, etc.). FIG. 8 is a block diagram of a digital system (e.g., a mobile cellular telephone) 800 that may be configured to use techniques described herein.

As shown in FIG. 8, the signal processing unit (SPU) 802 includes a digital signal processing system (DSP) that includes embedded memory and security features. The analog baseband unit 804 receives a voice data stream from handset microphone 813a and sends a voice data stream to the handset mono speaker 813b. The analog baseband unit 804 also receives a voice data stream from the microphone 814a and sends a voice data stream to the mono headset 814b. The analog baseband unit 804 and the SPU 802 may be separate ICs. In many embodiments, the analog baseband unit 804 does not embed a programmable processor core, but performs processing based on configuration of audio paths, filters, gains, etc being setup by software running on the SPU 802.

The display 820 may display pictures and video sequences received from a local camera 828, or from other sources such as the USB 826 or the memory 812. The SPU 802 may also send a video sequence to the display 820 that is received from various sources such as the cellular network via the RF transceiver 806 or the Bluetooth interface 830. The SPU 802 may also send a video sequence to an external video display unit via the encoder unit 822 over a composite output terminal 824. The encoder unit 822 may provide encoding according to PAL/SECAM/NTSC video standards.

The SPU 802 includes functionality to perform the computational operations required for video encoding and decoding. In one or more embodiments, the SPU 802 is configured to perform computational operations for applying one or more techniques for transformation and inverse transformation during the encoding process as described herein. Software instructions implementing all or part of the techniques may be stored in the memory 812 and executed by the SPU 802, for example, as part of encoding video sequences captured by the local camera 828. The SPU 802 is also configured to perform computational operations for applying one or more techniques for inverse transformation as described herein as part of decoding a received coded video sequence or decoding a coded video sequence stored in the memory 812. Software instructions implementing all or part of the techniques may be stored in the memory 812 and executed by the SPU 802.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein. For example, embodiments have been described herein in reference to HEVC. One of ordinary skill in the art, having benefit of this disclosure, will understand other embodiments in which the video encoding/decoding may include more or fewer transform block sizes and/or differing transform block sizes such as transform block sizes larger than 64×64.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method, comprising:

receiving, by a transform component in a video encoder, an n×n residual block in a transform component of the video encoder;

transforming, by the transform component in the video encoder, the residual block to a transform coefficient block, the transforming comprising applying a combination of n/m m-point Hadamard transforms, an n×n permutation matrix, and m n/m-point discrete cosine transforms to the received residual block, where m<n, wherein the n×n permutation matrix is applied between the n/m m-point Hadamard transforms and the m n/m-point discrete cosine transforms; and communicating, by the transform component in the video encoder, the transformed residual block.

2. The method of claim 1, wherein the transforming step comprises:

applying, by the transform component in the video encoder, the n/m m-point Hadamard transforms to the residual block;

arranging, by the transform component in the video encoder, the Hadamard-transformed residual block using the n×n permutation matrix; and applying, by the transform component in the video encoder, the m n/m-point discrete cosine transforms to the arranged Hadamard-transformed residual block.

3. The method of claim 2, wherein the permutation matrix has one entry with a value for 1 in each row and each column.

4. The method of claim 3, wherein the permutation matrix is an identity matrix.

5. The method of claim 1, wherein the transforming step comprises:

applying, by the transform component in the video encoder, the m n/m-point discrete cosine transforms to the residual block;

arranging, by the transform component in the video encoder, the transformed residual block using the n×n permutation matrix; and applying, by the transform component in the video encoder, the n/m m-point Hadamard transforms to the arranged transformed residual block.

6. The method of claim 1, wherein the transforming step comprises:

performing direct matrix multiplication to compute a multiplication selected from the group consisting of $TXT^T$ and $T^TXT$, where X corresponds to the n×n residual block, and where T is a matrix corresponding to a matrix product of individual matrices H, P, and D, the matrix D derived as the Kronecker product of an m×m identity matrix and an (n/m)×(n/m) discrete cosine transform matrix or inverse discrete cosine transform matrix, the matrix H derived as the Kronecker product of an (n/m)×(n/m) identity matrix and the m×m Hadamard transform, and the matrix P in the form of an n×n permutation matrix arranged to preserve sequency.

7. The method of claim 1, wherein the transforming step comprises:

applying a combination of the Hadamard transforms, permutation matrix, and discrete cosine transforms to columns of the residual block as received; and then applying a combination of the Hadamard transforms, permutation matrix, and discrete cosine transforms to rows of the residual block resulting from the applying of the combination of the Hadamard transforms, permutation matrix, and discrete cosine transforms to rows of the residual block.

8. The method of claim 1, wherein the transforming step comprises:

applying a combination of the Hadamard transforms, permutation matrix, and discrete cosine transforms is applied to rows of the residual block as received;

then applying a combination of the Hadamard transforms, permutation matrix, and discrete cosine transforms to columns of the residual block resulting from the applying of a combination of the Hadamard transforms, permutation matrix, and discrete cosine transforms to columns of the residual block.

* * * * *